(12) United States Patent
Togawa

(10) Patent No.: US 7,357,660 B2
(45) Date of Patent: Apr. 15, 2008

(54) QUICK CONNECTOR

(75) Inventor: Taeko Togawa, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/499,693

(22) Filed: Aug. 7, 2006

(65) Prior Publication Data
US 2007/0037423 A1 Feb. 15, 2007

(30) Foreign Application Priority Data
Aug. 10, 2005 (JP) ............... 2005-232016

(51) Int. Cl.
H01R 13/627 (2006.01)
(52) U.S. Cl. .................................... 439/352
(58) Field of Classification Search ................ 439/352; 285/81, 316, 314, 319, 315, 361
See application file for complete search history.

(56) References Cited
U.S. PATENT DOCUMENTS
6,857,663 B2 * 2/2005 Nagata et al. ............... 285/81

7,118,403 B1 * 10/2006 Drye et al. .................. 439/352

FOREIGN PATENT DOCUMENTS
JP 11-201355 A 7/1999

* cited by examiner

Primary Examiner—Phuong Dinh
(74) Attorney, Agent, or Firm—Birch, Stewart, Kolasch & Birch, LLP

(57) ABSTRACT

A quick connector is capable of reducing wobbling due to vibrations, and even after the retaining member is reused repeatedly, sealing property can be maintained and wobbling can be made smaller. A quick connector is provided with, a female connector member, a male connector member which fits into the female connector via a sealing member, and a retaining member which exists in a circular space between these connector members, interposed between the inner periphery of the female connector member and the outer periphery of the male connector member to be engaged therewith, thereby preventing the male connector member from coming off in the connector central line direction, wherein, a locking ring having a first fitting part which fits between the inner periphery of the retaining member and the outer periphery of the male connector member is provided on the outer periphery of the male connector member.

19 Claims, 10 Drawing Sheets

QUICK CONNECTOR

CROSS-REFERENCE TO RELATED APPLICATIONS

The present application claims priority under 35 USC 119 to Japanese Patent Application No. 2005-232016 filed on Aug. 10, 2005 the entire contents of which are hereby incorporated by reference.

FIELD OF THE INVENTION

The present invention relates to a quick connector which includes a male connector member and a female connector member, to connect hoses, pipes or the like, for transferring various fluids.

DESCRIPTION OF BACKGROUND ART

Generally, there is known a quick connector which is provided with a female connector member, a male connector member which fits into this female member via a sealing member, and a retainer which exists in a circular space between the connector members and which is interposed between the inner periphery of the female connector member and the outer periphery of the male connector member to be engaged therewith, thereby preventing the male connector member from coming off from the female connector member in the axial direction. See, for example, JP-A No. 201355/1999. This type of connector can be removed and disassembled easily without using a tool such as a releasing tool. In addition, this type of connector has another advantage in that the retainer is reusable.

However, in the configuration as described above, a portion where the female connector member seals and retains the male connector member is offset away from a portion where the male connector member is fixed on the female connector member. Therefore, there is a possibility that vibrations may occur on each component.

SUMMARY AND OBJECTS OF THE INVENTION

In order to further improve the conventional art as described above, an object of the present invention is to provide a quick connector which is capable of reducing wobbling due to vibrations.

An embodiment of the present invention is directed to a quick connector which is provided with, a female connector member, a male connector member which fits into the female connector via a sealing member, and a retaining member which exists in a circular space between these connector members, that is interposed between the inner periphery of the female connector member and the outer periphery of the male connector member to be engaged therewith, thereby preventing the male connector member from coming off in the axial direction. A locking ring is provided having a first fitting part which fits between the inner periphery of the retaining member and the outer periphery of the male connector member on the outer periphery of the male connector member.

According to an embodiment of the present invention, the first fitting part of the locking ring fits between the inner periphery of the retaining member and the outer periphery of the male connector member. Therefore, the support strength between the male connector member and the retaining member is improved, whereby vibrations of the members can be suppressed.

In this case, the locking ring may be provided with a second fitting part which fits between the inner periphery of the female connector member and the outer periphery of the male connector member. Since this configuration includes the second fitting part, the support strength between the male connector member and the female connector member is improved, thereby suppressing the vibration of each member even further.

It is also possible that the locking ring is provided with a locking ring body, and a pair of operational pieces which extend continuously from the locking ring body and extend to the direction for intersecting the connector central line. In this configuration, the pair of operational pieces thus provided may enhance the assembling properties of the locking ring. Furthermore, the retaining member is provided with operational arm parts for a diameter-reduction operation, and the direction to which a pair of the operational pieces extends may be orthogonal to the direction to which the operational arm parts extend. In this configuration, even in the case where the operational pieces are bent and simultaneously the operation for bending the operational arm of the retaining member is performed, it can be carried out easily without a loss of operability. Furthermore, the locking ring may be configured such that a projecting amount of the second fitting part from the locking ring body is smaller than a stroke amount at the time when the locking ring is operated. Since the stroke amount is larger, it is possible to easily detach and attach the locking ring.

The second fitting part may be formed on both surfaces of the locking ring body. In this configuration, the locking ring body is available for use regardless of the sides, front or back. Therefore, erroneous assembling can be prevented and this enhances the assembling properties. In addition, the male connector member may be provided with a positioning part for aligning the locking ring. This may enhance the assembling properties of the locking ring, as well as preventing the locking ring from dropping off.

In an embodiment of the present invention, not only is the reuse of the retaining member is easily performed, but also the removing and disassembling are easy even without using a tool such as releasing tools. In addition, wobbling of the member due to vibrations can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
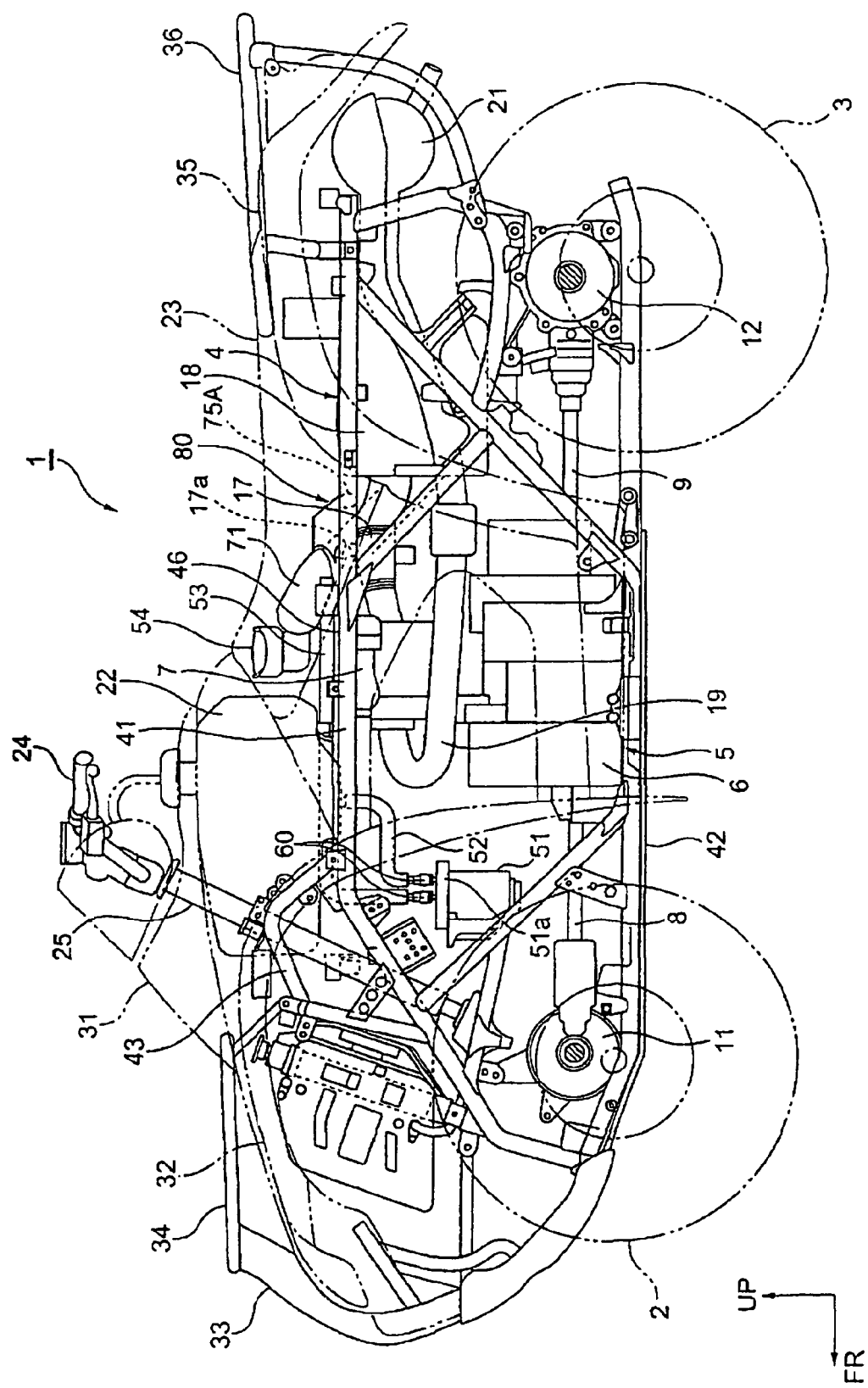
FIG. 1 is a side view of an ATV vehicle relating to one embodiment of the present invention.

Hereinafter, one embodiment of the present invention will be explained with reference to the accompanying drawings. Orientations such as front, back, right, and left described in the following are identical to those with respect to the traveling direction of a vehicle, unless otherwise specified. In the drawings, arrow FR, arrow LH, and arrow UP indicate, respectively, the front side of the vehicle, left side of the vehicle, and upper side of the vehicle.

A saddle-ride type vehicle 1 of the present embodiment is a so-called ATV, whose front and rear wheels 2 and 3 are equipped with low-pressure balloon tires having a large diameter, assuring a large minimum road clearance to enhance the operation through performance mainly on the uneven road.

An engine 5 arranged in a vertical layout is mounted on nearly the center of the vehicle frame 4, and power is outputted to each propeller shaft 8, 9, respectively, for the front wheel and the rear wheel, via a change gear that is not illustrated. The propeller shafts 8, 9 transmit power respectively to the front and rear wheels 2, 3, via power distribution mechanisms 11, 12. It is to be noted that in the present embodiment, a crankcase 6 constituting the lower part of the engine 5 also serves as a change gear case which accommodates the change gear.

The vehicle body frame 4 includes upper pipes 41 and lower pipes 42 which extend approximately along the longitudinal direction of the vehicle body, and which are provided on the right and the left sides thereof. Pipe linkages are made by linking both pipes 41, 42 on both sides of the vehicle body that are combined by multiple cross pipes 75, 75A (see FIG. 2), thereby constituting almost a box-like structure.

An engine 5 is mounted nearly at the center position on the bottom side of the vehicle frame 4, and the cylinder head 7 part of the engine 5 is placed at a position slightly lower than the upper pipes 41. At a position on the vehicle rear side of the engine 5, the vehicle body frame 4 is provided with an air cleaner 18 of an engine inlet system.

This air cleaner 18 is connected to the inlet part on the rear side of the cylinder head 7 via a throttle body 17. At a position that is offset in the vehicle width direction from the throttle body 17 on the front side of the air cleaner 18, there is provided a snorkel 54 which extends obliquely in an upwardly and forward direction. Outside air is introduced from the opening on the front end of the snorkel 54. An injector 17a which is a fuel introducing part is integrally assembled with the throttle body 17. Fuel that is supplied from the fuel pump 51 described below is controlled by the controller (not illustrated), and injected into the inlet path.

On the other hand, the front part of the cylinder head 7 is connected to the base end part of an exhaust pipe 19. The exhaust pipe 19 extends once to the front side and then is bent rearwardly, so that it is connected to the silencer 21 on the vehicle rear side.

A fuel tank 22, made of resin, is placed on the upper side of the engine 5. On the rear side of the fuel tank 22, there is provided an openable and closable saddle-ride type seat 23, in such a manner that the upper side of the throttle body 17, the snorkel 54, the air cleaner 18, and the like are covered with this seat. Handlebar stem parts 43 are provided on the front side position of the engine in the vehicle body frame 4. The handlebar stem parts 43 support a steering shaft 25.

This steering shaft 25 is equipped with a handlebar 24 on the upper end thereof, having a shape of a bar, and a front wheel steering mechanism, not illustrated, is coupled with the lower end of the steering shaft 25. The front part of the fuel tank 22 curves in almost a U-shape, in such a manner to go around both sides of the steering shaft 25, thereby ensuring sufficient capacity.

Then, on the lower side of the fuel tank 22, a fuel pump 51 is placed in such a manner as to be positioned on the front side of the engine 5. A communication pipe 52 extends downwardly from the fuel tank 22 and is connected to the inlet port of the fuel pump 51. A fuel supply pipe 53, for supplying discharged fuel to the injector 17a, is connected to the outlet port of the fuel pump 51.

On the other hand, a heat shield plate 46 is mounted immediately below the position where almost a rear half part of the fuel tank 22 to the front part of the seat 23 is located. The heat shield plate is placed across the left and right upper pipes 41, 41 of the vehicle frame 4. The heat shield plate 46 partitions the engine 5, and the fuel tank 22 and the seat 23 on the upper side thereof, thereby serving as a shield to interrupt the spread of high heat from the engine towards the fuel tank 22 and the seat 23.

Figure 2:
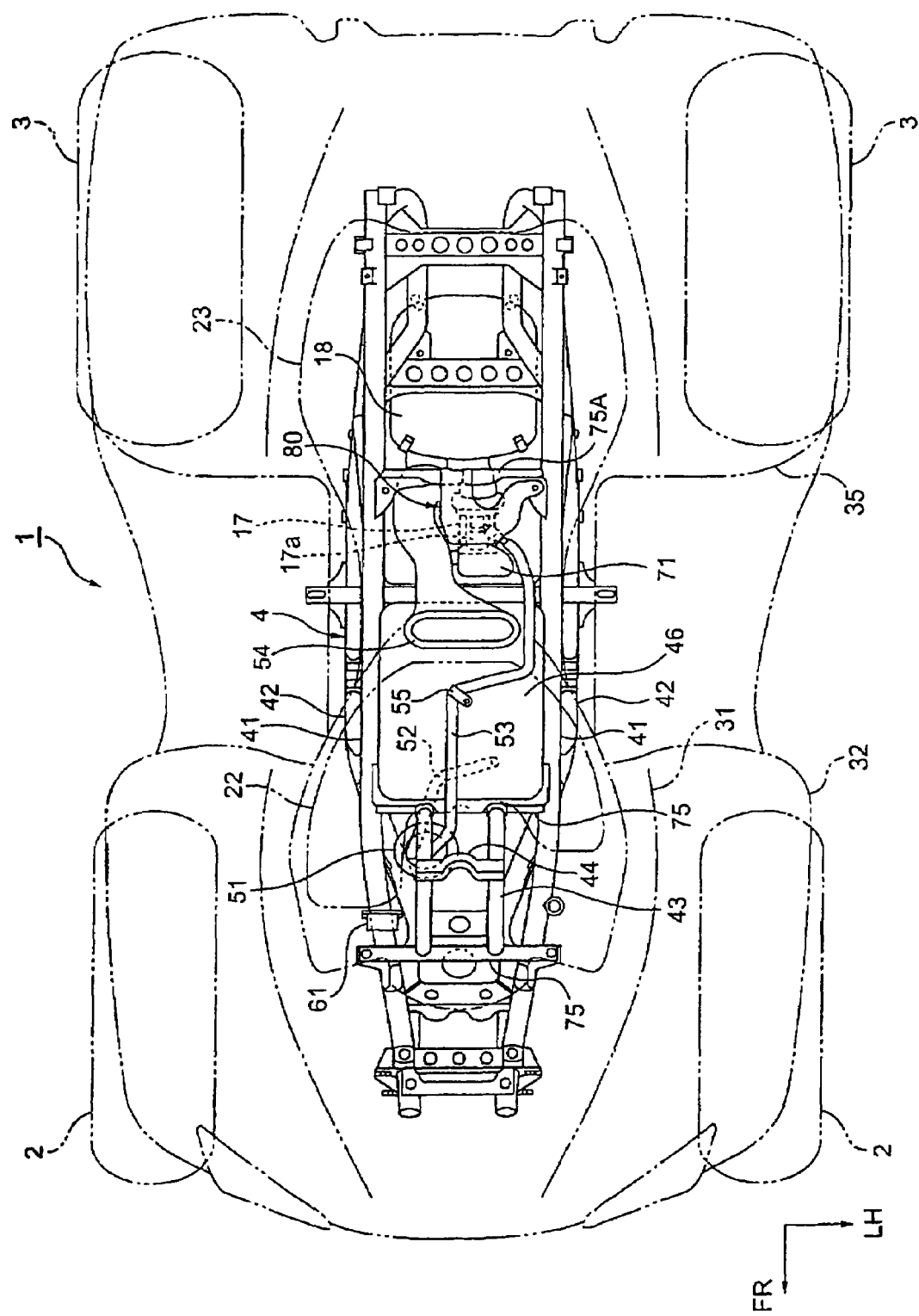
FIG. 2 is a top view of the ATV vehicle.

The fuel supply pipe 53, one end of which is connected to the fuel pump 51, is drawn upwardly from the front-end part of the heat shield plate 46, and installed along the upper surface of heat shield plate 46. As shown in FIG. 2, the fuel supply pipe 53 is bent in a shape of a crank from the top view, on the upper surface side of the heat shield plate 46, so as to go around the snorkel 54 and the like which extend from the air cleaner 18 towards an upper side of the heat shield plate 46. A portion of the bent part of the fuel supply pipe 53 is locked on a set position on the heat shield plate 46 via the clamp 55 as a part that is fixed in position.

Figure 3:
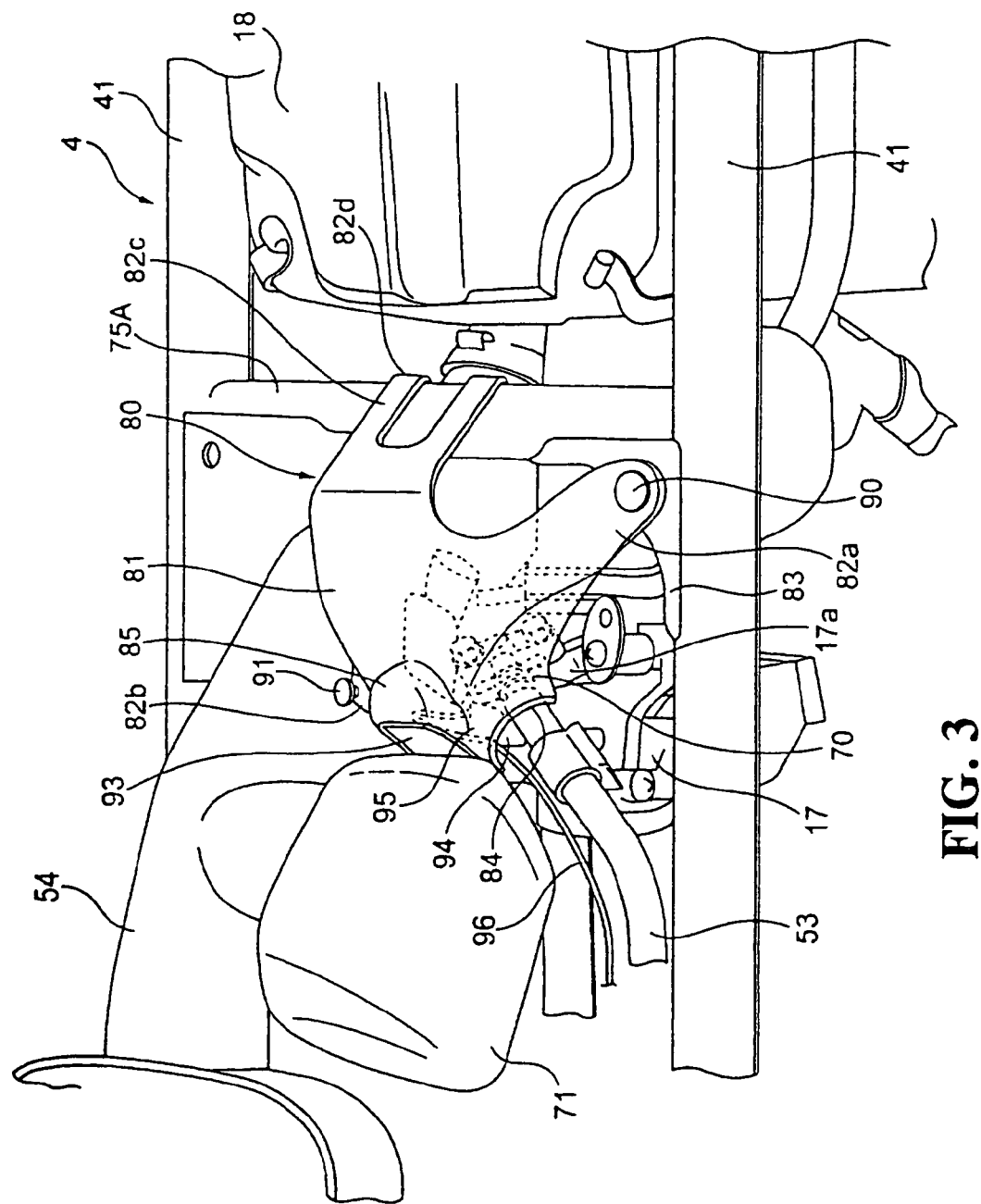
FIG. 3 is a perspective view of the vicinity of a throttle body of the ATV vehicle.

The snorkel 54 is coupled and supported by the near center of the rear end part of the heat shield plate 46 and is joined with a bolt or the like. On a position of the snorkel 54, a little tilted to the vehicle rear side rather than in conjunction with the heat shield plate 46, there is provided a resonator 71 (vehicle body component) which is branching off towards the left side direction of the vehicle body. As shown in FIG. 3, this resonator 71 projects in approximately a trapezoidal shape, towards the vehicle rear side from the connection pipe part.

Under the condition that the seat 23 is raised upwardly, the air cleaner 18, snorkel 54, and the like which are located below the seat 23 are exposed to the outside of the vehicle together with the upper pipes 41 and the like of the vehicle body frame 4. However, the upper side of the throttle body 17 is provided with a protect cover 80 made of resin, and the protect cover 80 covers this throttle body 17 so as to prevent the upper surface thereof from directly being exposed to the outside of the vehicle.

As for the protect cover 80, support arms 82a, 82b, and 82c provided to extend on the peripheral border of the cover base 81 which is curved upwardly. One support arm 82a is fixed by a clip 90 on a gusset plate 83 that is provided in such a manner as going across the joint between the cross pipe 75A and the upper pipes 41. Another support arm 82b is located on the diagonal position of the support arm 82a is fixed by the clip 91 on a flange, not illustrated, which is provided on the snorkel 54 in an extended manner.

The remaining support arm 82c is a supplemental arm, having a curl part 82d provided on the tip thereof, which is locked in such a manner as to wind around the near center of the cross pipe 75A. Therefore, the protect cover 80 is supported by the vehicle body frame 4 having the cross pipe 75A as a principal element and the snorkel 54.

On the vehicle body left side of the cover base 81, a guide wall 84 includes a circular arc shaped cross section which covers the upper side of the fuel supply pipe 53. On the upper wall on the vehicle front side of the cover base 81, a projecting part 85 that projects upwardly is formed. Inside the projecting part 85, a component protecting space 93 is allocated to arrange the injector 17a, a coupler 94 connected to the injector 17a, a connector 95, wiring 96, and the like.

In FIGS. 1 and 2, a vehicle body cover 31 is made of resin which covers the vehicle front part including the fuel tank. A front fender 32 and a rear fender 35 are provided that are made of resin for, respectively, covering the front wheels and the rear wheels. As illustrated in FIG. 1, a front protector 33 and a front carrier 34 are provided together with a rear carrier 36.

Figure 4:
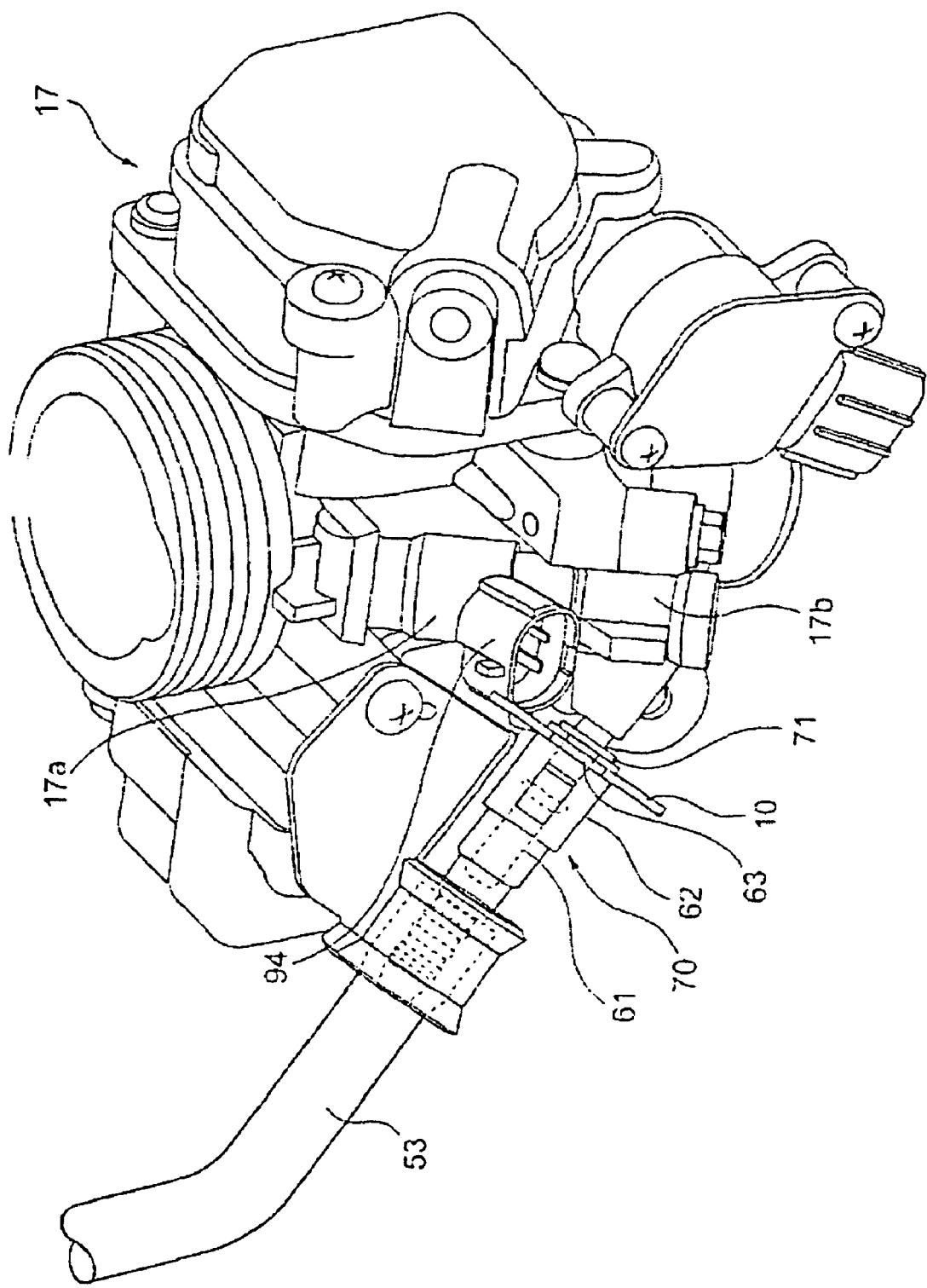
FIG. 4 is a perspective view of the throttle body.
Figure 5:
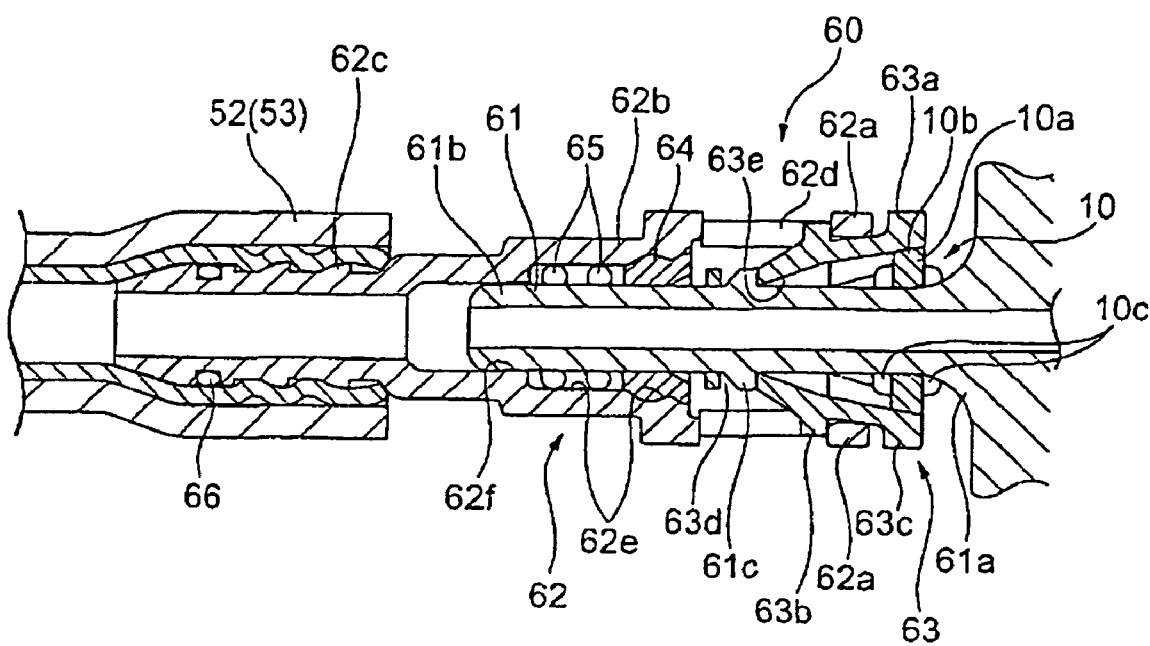
FIG. 5 is a cross-sectional view of a quick connector.
Figure 6:
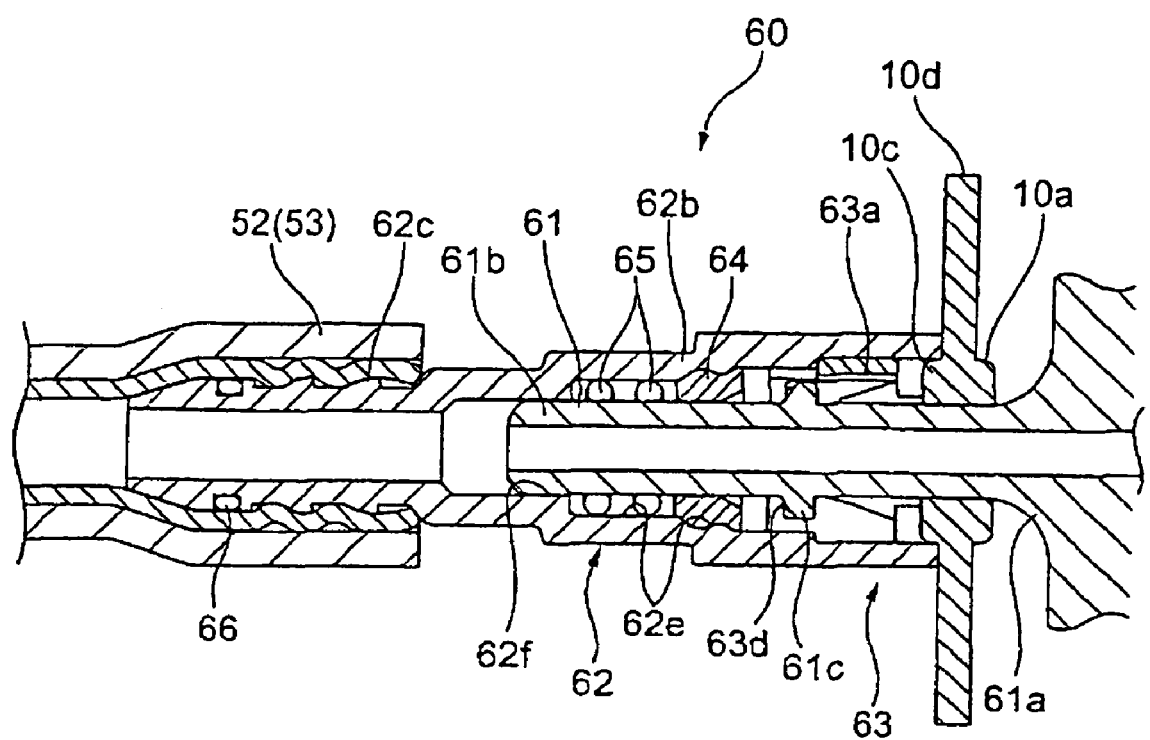
FIG. 6 is a cross-sectional view of the quick connector.

As shown in FIG. 1, in the present embodiment, quick connectors 60 both have nearly the same structure and are connected between the communication pipe 52 and the fuel pump 51, and between the fuel supply pipe 53 and the fuel pump 51. As shown in FIGS. 3 and 4, a quick connector 70 having a different structure connects between the fuel supply pipe 53 and the injector 17a. In FIGS. 5 and 6, the quick connector 60 is provided with a male connector member 61, a female connector member 62 into which the male connector member 61 is inserted, a retaining member 63 for fixing the male connector member 61 so that it may not come off from the female connector member 62 and sealing members 64, 65 for providing a seal between the male connector member 61 and the female connector member 62.

As for the male connector member 61, its base (positioning part) 61a has a curved shape, and integrally continues to the cover member 51a of the fuel pump 51. At nearly the center thereof, being apart from the tip 61b for a predetermined distance, projecting portions 61c are provided that project in the centrifugal direction. The male connector member as a whole forms a stick-like member having a nearly pipe shape. The tip 61b of the male connector member 61 is subjected to a drawing process so as to take the radius on the outer circumferential surface for facilitating insertion into the female connector member 62. It is to be noted that the male connector member 61 forms a shape for rotational symmetry about the axis line.

The female connector member 62 is a nearly tubular shaped member produced from a single piece item that is, for example, made of a glass fiber reinforced nylon resin. The female connector member 62 includes a base 62a, an intermediate part 62b and a tip part 62c. The communication pipe 52 (or the fuel supply pipe 53) is connected to the outer periphery of the tip part 62c via an O-ring 66.

On the periphery wall of the base end 62a, a pair of window holes 62d is formed in an opposed manner, each having a large opening, nearly rectangular shaped, with a size also available for checking assembly. On the inner wall of the intermediate part 62b, a contact surface 62e comes into contact with the outer surface of the ring-shaped sealing member 64 and an O-ring 65 is formed. In addition, a receiving surface 62f is formed for receiving the tip 61b of the male connector member 61.

Figure 7:
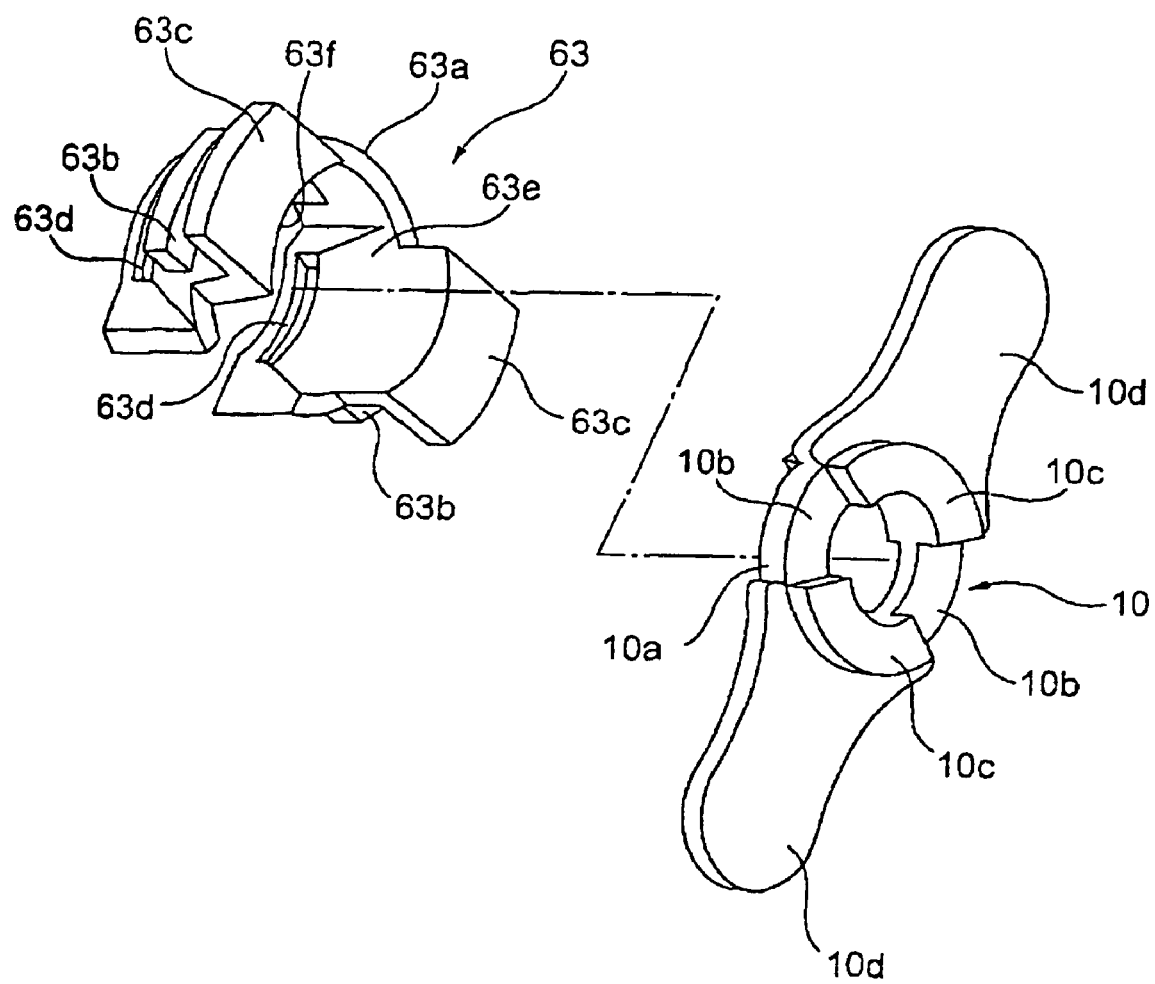
FIG. 7 is a perspective view of a retaining member and a locking ring.

The retaining member 63 is a one-piece member made of polyamide resin, which is capable of being elastically deformed so that most of the retaining member 63 is inserted into the base 62a of the female connector member 62. As shown in FIG. 7, the retaining member 63 is provided with a main body part 63a having a cross section of almost a C shape, whose diameter can be expanded or reduced by the elastic deformation. The outside wall of the main body part 63a is provided with a pair of locking parts 63b for engaging with the end faces of the window holes 62d, a pair of operational arm parts 63c that is used for removing the quick connector, and a pair of locking hole parts 63d for locking the projecting parts 61c of the male connector member 61.

As shown in FIGS. 5 and 6, on the base 61a of the male connector member 61, there is arranged an elastically deformable locking ring 10, which is made of rubber, polyamide resin, or the like. As shown in FIGS. 7 and 8a to 8d, the locking ring 10 is provided with a ring-shaped locking ring body 10a. The locking ring body 10a is provided with a first fitting part 10b for abutting against the inner periphery surface 63e of the retaining member 63 and which is capable of fitting between the inner periphery surface 63e of the retaining member 63 and the outer periphery surface of the male connector member 61. A pair of second fitting parts 10c extend in almost a fan-like manner from each other in the periphery direction and is allowed to fit between the inner periphery surface of the female connector member 62 and the outer periphery part of the male connector member 61, and a pair of operational pieces 10d which project from the locking ring body 10a and extend in the direction intersecting the connector center line.

The second fitting parts 10c are integrally formed on both sides of the locking ring body 10a, and even when the locking ring 10 is mounted mixing up the front and the back side thereof, the second fitting parts 10c on either surface fit between the inner periphery part of the female connector member 62 and the outer periphery of the male connector member 61.

Figure 8B:
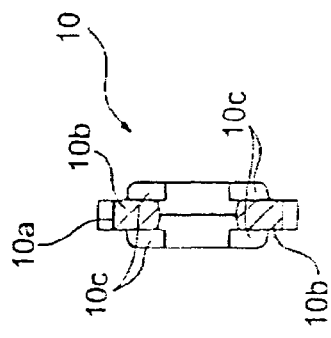
FIG. 8a to FIG. 8d are a plan view and cross-sectional views of the locking ring.
Figure 8D:
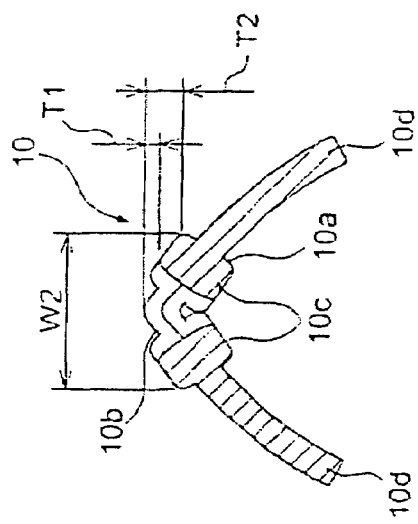
Figure 8A:
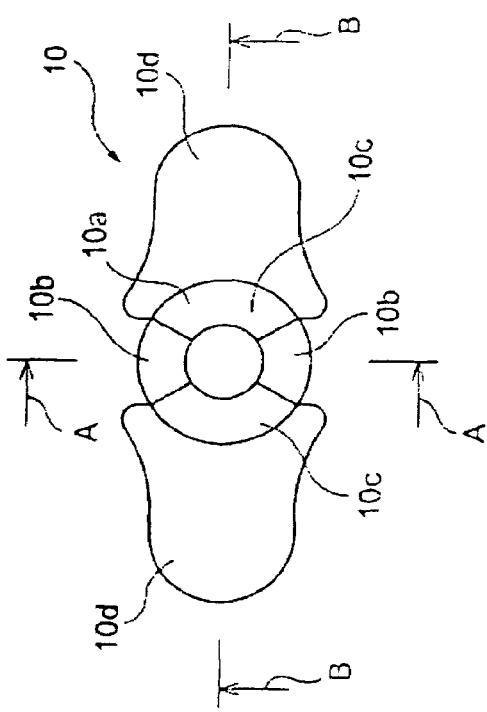
Figure 8C:
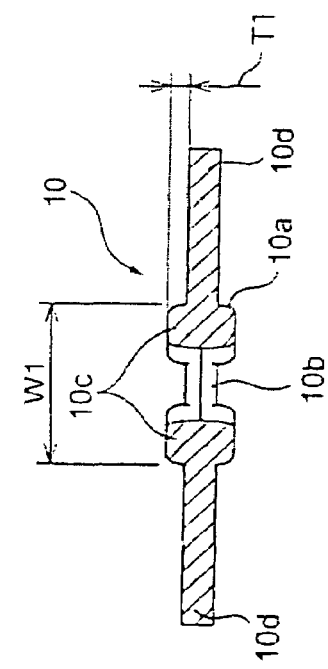

When a pair of the operational pieces 10d is pressed and bent in such a manner as pressing against the cover body 51a of the fuel pump 51, the operational pieces undergo displacement from the position as shown in FIG. 8c to the position as shown in FIG. 8d, for example. According to this displacement, the width dimension of the second fitting part 10c is reduced in diameter from the dimension W1 to the dimension W2. This operation for diameter reduction is carried out when the quick connector is removed as described below.

In FIG. 8c, the projecting amount of the second fitting parts 10c from the locking ring body 10a is set to T1, and when a pair of the operational pieces 10d is displaced, the second fitting parts 10c go backward for the dimension T2 beyond the projecting amount T1 as shown in FIG. 8d. This dimension T2 is assumed as a so-called stroke amount at the time of operating the locking ring 10. With this configuration, the stroke amount T2 is set to be larger than the projecting amount T1.

In the configuration as described above, when a pair of the operational pieces 10d is displaced, the width of the second fitting parts 10c is reduced from W1 to W2, and the second fitting parts 10c go backward to the depth T2. Therefore, the second fitting parts 10c can easily escape from the place between the inner periphery of the female connector member 62 and the outer periphery of the male connector member 61.

Next, operations of the quick connector will be explained.

Figure 9:
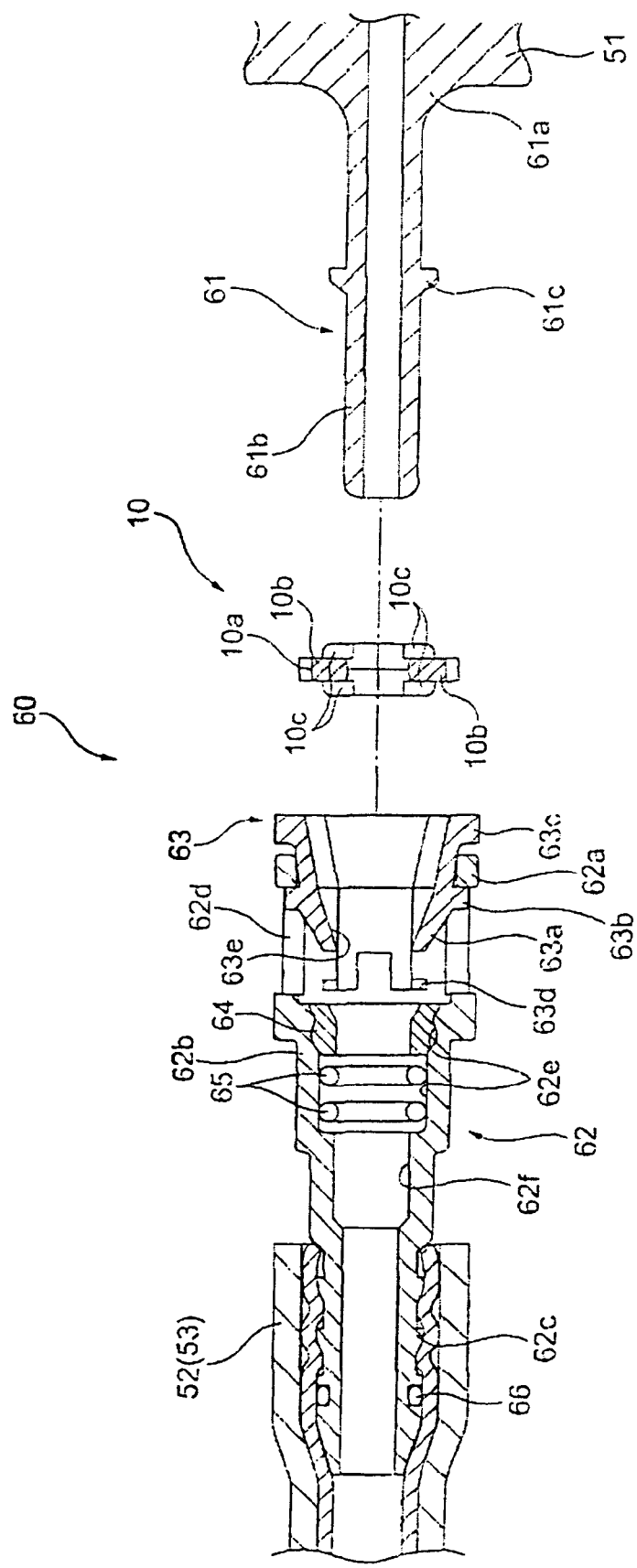
FIG. 9 is a longitudinal cross-sectional view of the quick connector at the time of coupling.
Figure 10:
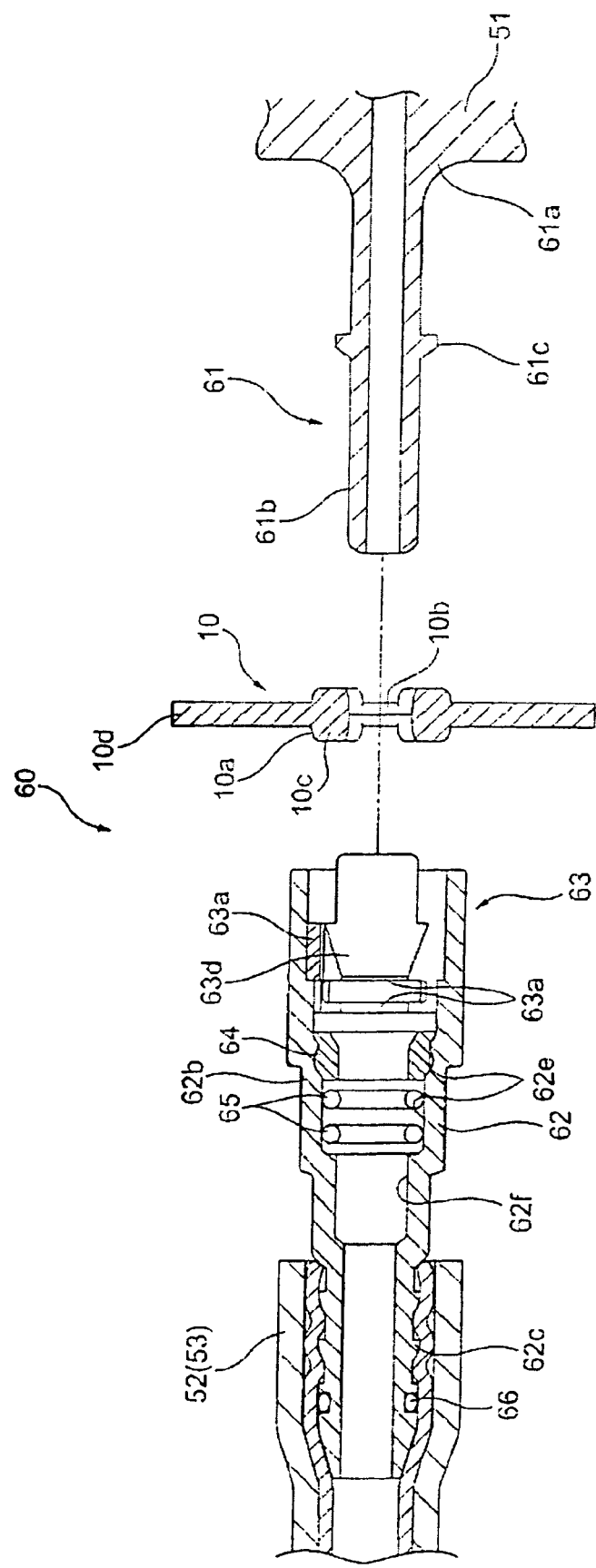
FIG. 10 is a transverse cross-sectional view of the quick connector at the time of coupling.

With reference to FIGS. 9 and 10, for establishing a connection by the quick connector, first, the elastically deformable locking ring 10 is made to fit to the base 61a of the male connector member 61. Next, as shown in FIG. 9, the O-ring 65 and the sealing member 64 sequentially in this order are made to fit into the intermediate part 62b of the female connector member 62. Furthermore, the retaining member 63 is inserted into the base 62a. Then, the locking parts 63b of this retaining member 63 are made to lock onto the end faces of the window holes 62d of the female connector member 62, and the retaining member 63 is held within the base 62a of the female connector member 62.

In other words, in the present procedure, the window holes 62d of the female connector member 62 and the locking parts 63b of the retaining member 63 are aligned in the circumferential direction, and this retaining member 63 is inserted into the base 62a of the female connector member 62. Since the retaining member 63 has a C-shape, it is inserted while the diameter is reduced. When the retaining member 63 arrives at a predetermined insertion depth, the locking parts 63b of the retaining member 63 are urged towards the direction expanding the diameter by elasticity, and displaced towards the outside. Then, the locking parts 63b are engaged with the window holes 62d of the female connector member 62. As a result, the retaining member 63 is held in the base 62a of the female connector member 62 without coming off therefrom in the axial direction.

Here, the operational ends of the operational arm parts 63c of the retaining member 63 are kept to be projecting from the insertion open end of the female connector member 62.

Thereafter, the open end of the female connector member 62 and that of the retaining member 63 are positioned to the tip of the male connector member 61, and the male connecter member 61 is inserted therein, to have nearly the same axis line. In this case, the locking ring 10 is made to rotate in the circumferential direction, and the positional relationship between the locking ring 10 and the retaining member 63 is maintained as the positional relationship shown in FIG. 7.

Accordingly, the shaft of the male connector member 61 penetrates into the retaining member 63, the sealing member 64, and the O-ring 65, sequentially in this order, and the tip 61b of the shaft is accommodated in the receiving surface 62f of the intermediate part 62b of the female connector member 62.

In this condition, the projecting parts 61c of the male connector member 61 enter while pushing the retaining member 63 aside, and fits into the locking hole parts 63d of the retaining member 63. Further the first fitting part 10b of the locking ring 10 fits between the inner periphery surface 63e of the retaining member 63 and the outer periphery of the male connector member 61. Then, the second fitting parts 10c fit between the inner periphery of the female connector member 62 and the outer periphery of the male connector member 61.

In the present configuration, the tip 61b of the male connector member 61 is held on the receiving surface 62f of the female connector member 62, and the first fitting part 10b of the locking ring 10 fits between the inner periphery surface 63e of the retaining member 63 and outer periphery of the male connector member 61. Further, the second fitting parts 10c fit between the inner periphery of the female connector member 62 and the outer periphery of the male connector member 61. Therefore, this male connector member 61 is held at two points, that is, on the receiving surface 62f and at the first fitting part 10b (second fitting parts 10c), thereby stabilizing the posture of the male connector member 61 against the female connector member 62. Accordingly, wobbling between the male connector member 61 and the female connector member 62 is avoided, and further wobbling due to vibrations of each component can be suppressed, whereby the connection by the quick connector can be stable.

Since the sealing member 64 and the O-ring 65 are held between the outer periphery surface of the male connector member 61 and the intermediate part 62b of the female connector member 62, high water tightness and air tightness can be obtained between the male connector member 61 and the female connector member 62.

In removing and disassembling the quick connector, firstly by operating the operational pieces 10d of the locking ring 10, the locking ring 10 is removed.

In this case, the operational pieces 10d are gripped and displaced from the position as shown in FIG. 8c to the position as shown in FIG. 8d. With this displacement, the second fitting parts 10c are reduced in diameter to the width W2, and allowed to go backwardly to the depth T2. When this operation is carried out, the second fitting parts 10c easily escape from between the inner periphery of the female connector member 62 and the outer periphery of the male connector member 61. It is to be noted that in some cases, the locking ring 10 can be torn off for removal. In this state, simultaneously, the operational arm parts 63c of the retaining member 63 are pressed to be shrunk by a fingertip or the like. Then, the locking parts 63b of the retaining member 63 can be detached from the window holes 62d of the female connector member 62. Therefore, just by pulling out the male connector member 61, the male connector member 61 and the retaining member 63 can be removed from the female connector member 62.

In the aforementioned case, since the direction into which a pair of the operational pieces 10d extends is orthogonal to the direction to which the operational arm parts 63c extend, it is possible to improve the operability in performing the operation of the operational pieces 10d and the operation of the operational arm parts 63c simultaneously.

As shown in FIG. 5, in the quick connector 60, the base 61a of the male connector member 61 has a curved shape. Since this curved part prevents the locking link body 10a of the locking link 10 from moving towards the back. Therefore, the curved part decides the position of the locking ring 10. On the other hand, the quick connector 70 having a different structure as describe above (see FIGS. 3 and 4) that connects between the fuel supply pipe 53 and the injector 17a, does not have a curve-shaped base 61a of the male connector member 61, the illustration of which is omitted. In the case above, the base 61a does not decide the position of the locking ring 10.

In such a case, it is desirable to establish a projection-shaped stopper 71 at the position corresponding to the base 61a, for example, as shown in FIG. 4.

As described so far, the present invention has been explained based on one embodiment, but the present invention is not limited to this example. For example, in the configuration above, the quick connector is applied to the pipe arrangement for the fuel system, but it is not limited to this example. This connector may also be applied to the pipe connection for water, oil, air, or the like.

In addition, in the above embodiment, the present invention is applied to an ATV vehicle, but it is not limited to this example. The present invention may be applied to a two-wheeled vehicle, three-wheeled vehicle, or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A quick connector comprising:
   a female connector member;
   a male connector member adapted to fit into the female connector via a sealing member;
   a retaining member disposed in a circular space between the connector members, interposed between an inner periphery of the female connector member and an outer periphery of the male connector member to be engaged therewith, thereby preventing the male connector member from coming off in the axial direction; and
   a locking ring including a first fitting part for fitting between an inner periphery of the retaining member and the outer periphery of the male connector member, said locking ring being provided on the outer periphery of the male connector member,
   wherein the locking ring includes a second fitting part disposed between the inner periphery of the female connector member and the outer periphery of the male connector member.

2. The quick connector according to claim 1, wherein the locking ring includes a locking ring body and a pair of operational pieces being continuously provided from the locking ring body, and extending in the direction intersecting the connector central line.

3. The quick connector according to claim 1, wherein the second fitting part is formed on each of both surfaces of the locking ring body.

4. The quick connector according to claim 1, wherein a positioning part for the locking ring is provided on the male connector member.

5. A quick connector comprising:
   a female connector member;
   a male connector member adapted to fit into the female connector via a sealing member;
   a retaining member disposed in a circular space between the connector members, interposed between an inner periphery of the female connector member and an outer periphery of the male connector member to be engaged therewith, thereby preventing the male connector member from coming off in the axial direction; and
   a locking ring including a first fitting part for fitting between an inner periphery of the retaining member and the outer periphery of the male connector member, said locking ring being provided on the outer periphery of the male connector member,
   wherein the locking ring includes a locking ring body and a pair of operational pieces being continuously provided from the locking ring body, and extending in the direction intersecting the connector central line.

6. The quick connector according to claim 5, wherein the retaining member includes an operational arm for diameter-reduction operation, wherein the direction to which the pair of operational pieces extends is nearly orthogonal to the direction to which the operational arm part extends.

7. The quick connector according to claim 2, wherein the retaining member includes an operational arm for diameter-reduction operation, wherein the direction to which the pair of operational pieces extends is nearly orthogonal to the direction to which the operational arm part extends.

8. The quick connector according to claim 5, wherein the locking ring is configured such that a projecting amount of the second fitting part from the locking ring body is smaller than a stroke amount at the time when the locking ring is operated.

9. The quick connector according to claim 2, wherein the locking ring is configured such that a projecting amount of the second fitting part from the locking ring body is smaller than a stroke amount at the time when the locking ring is operated.

10. The quick connector according to claim 6, wherein the locking ring is configured such that a projecting amount of the second fitting part from the locking ring body is smaller than a stroke amount at the time when the locking ring is operated.

11. The quick connector according to claim 7, wherein the locking ring is configured such that a projecting amount of the second fitting part from the locking ring body is smaller than a stroke amount at the time when the locking ring is operated.

12. The quick connector according to claim 5, wherein the second fitting part is formed on each of both surfaces of the locking ring body.

13. The quick connector according to claim 6, wherein the second fitting part is formed on each of both surfaces of the locking ring body.

14. The quick connector according to claim 8, wherein the second fitting part is formed on each of both surfaces of the locking ring body.

15. The quick connector according to claim 5, wherein a positioning part for the locking ring is provided on the male connector member.

16. The quick connector according to claim 6, wherein a positioning part for the locking ring is provided on the male connector member.

17. The quick connector according to claim 8, wherein a positioning part for the locking ring is provided on the male connector member.

18. A quick connector comprising:
    a female connector member;
    a male connector member adapted to fit into the female connector via a sealing member;
    a retaining member disposed in a space between the connector members, interposed between an inner periphery of the female connector member and an outer periphery of the male connector member to be engaged therewith, thereby preventing the male connector member from coming off in the axial direction;
    a locking ring including a first fitting part having a ring-shaped locking body for fitting between an inner periphery of the retaining member and the outer periphery of the male connector member, said locking ring being provided on the outer periphery of the male connector member wherein the ring-shaped locking body engages the inner periphery of the retaining member for forming a seal,
    wherein the locking ring includes a second fitting part disposed between the inner periphery of the female connector member and the outer periphery of the male connector member.

19. The quick connector according to claim 18, wherein a positioning part for the locking ring is provided on the male connector member.

* * * * *